Dec. 9, 1969  H. KOCH  3,482,277
FEEDING AND GUIDING DEVICE FOR PLASTIC STRIPS AND CABLES
Filed July 12, 1967
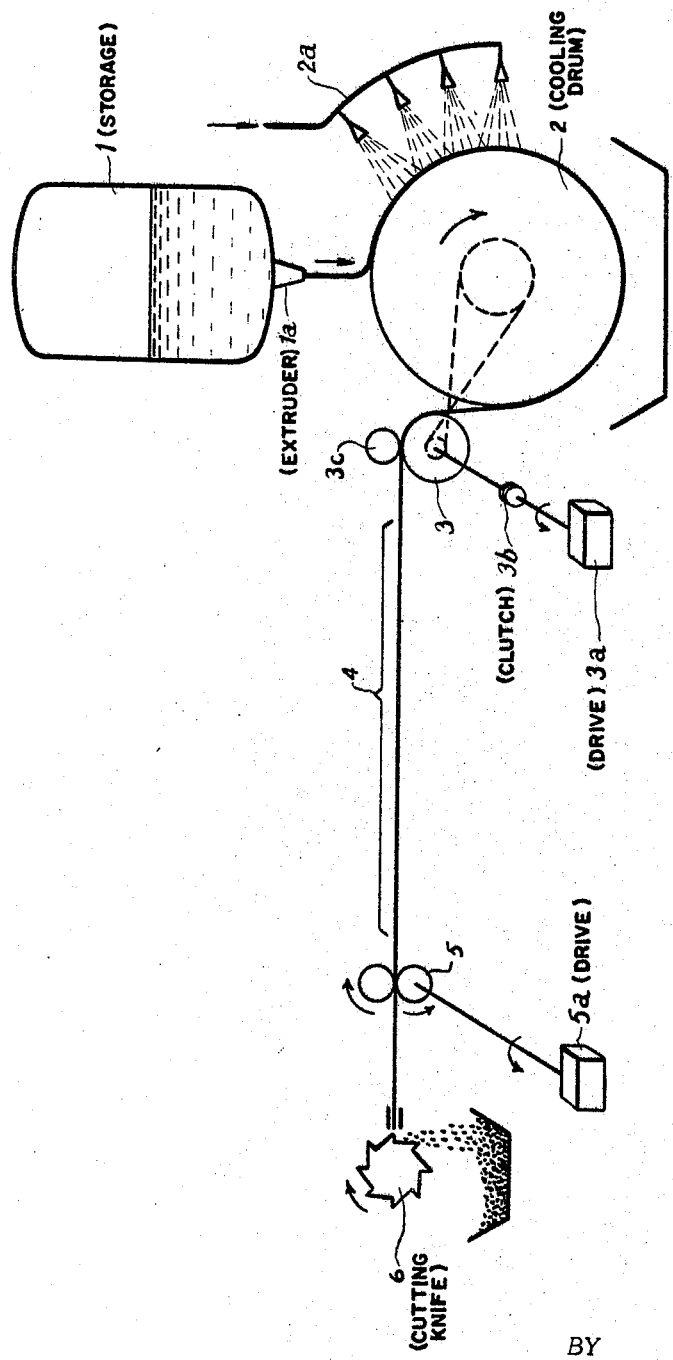
INVENTOR.
HANS KOCH United States Patent Office 3,482,277
Patented Dec. 9, 1969

3,482,277
FEEDING AND GUIDING DEVICE FOR
PLASTIC STRIPS AND CABLES
Hans Koch, Trin, Grisons, Switzerland, assignor to Inventa A.G. fur Forschung und Patentverwertung, Zurich, Switzerland
Filed July 12, 1967, Ser. No. 652,936
Claims priority, application Switzerland, July 22, 1966, 10,632/66
Int. Cl. B29f 3/10
U.S. Cl. 18—1         2 Claims

ABSTRACT OF THE DISCLOSURE

A feeding and guiding device for extruded lengths of plastics. The device consists of a cooling drum with guide roll and feed rollers, with a suitable equalization zone therebetween. The feed rollers supply the lengths of plastics to their final disposition and rotate at a slightly higher speed than drum and guide roll. Both drum and feed rolls have individual variable drives. At the start of the operation, the drive for the drum, provided with a free-wheeling clutch, transports the plastic, but after the latter has been taken up by the feed rolls, they provide the entire drive, due to their slightly higher speed. In case of a break of the plastic, the drum drive immediately takes over again, so that negligible interruption of the procedure is incurred.

---

Plastic strips, bands or continuous lengths of round profile, called "cables" if of considerable diameter, are produced by extrusion and require further processing prior to winding up or comminution into chips or the like. The materials, hereinafter called "cables" or "strips," for the sake of convenience, are cooled after leaving the extruder, usually with water. The plastic used may be a polyamide (nylon), polyester, polyvinyl chloride, or any desired plastic which does not become overly rigid and/or brittle at room temperature. Cooling frequently is carried out by conducting the cable over a cooling drum and simultaneous spraying with water. The plastic passes through a set of feed rollers before arriving at the windup or cutting device, as the case may be. Between the cooling drum and rollers, a comparatively long distance is provided which might be called an equalization or regeneration zone.

It is necessary that the speeds of the cooling drum, the feed rollers and any auxiliaries, if present, are precisely synchronized. In practice, continuously variable transmissions opportunely are used which individually are manually adjustable and provide the necessary feed- and windup speeds. However, it has been found extremely difficult to so synchronize these devices that neither damming up nor drag occurs in the cables or strips. Common drives for these devices cannot be employed because the variation in length of the plastic within the equalization zone does not remain constant.

It is the object of the invention to devise a combination of cooling drum and feed rollers, with a suitable equalization zone therebetween, wherein a plastic cable, strip or band is kept taut at a predetermined rate and without variations so that faultless feeding and guidance of the material is provided.

This is accomplished in the following manner:

The extruded length of plastic is conducted over the cooling drum and a guide roller, rigidly connected thereto, e.g., by chain and sprocket. The cooling drum is connected to a continuously (or infinitely) variable drive by way of a free-wheeling clutch. The length of plastic, after passing through the equalization zone, traverses the feed rollers which rotate at a slightly higher speed than that of the cooling drum. The feed rollers also are provided with a variable speed of the same kind. The length of plastic then is conducted to a windup or cutting device at a uniform rate of speed and without damming up or drag. That is the plastic is guided uniformly, continuously and faultlessly, to its destination. Without the combination of devices are described, it had previously been necessary to manually adjust the drives constantly, and uniformity was not assured.

The invention will now be more fully explained with reference to the accompanying drawing. However, it should be understood that this is given merely by way of illustration, and not of limitation, and that it is intended to cover all modifications and variations which do not depart from the spirit and the scope of the invention as hereinafter claimed.

The drawing shows the device according to the invention schematically.

Referring now to the drawing:

The plastic is withdrawn from storage vessel 1, where it may be in the form of melt or chips, and is extruded through extruder nozzle 1a. The length formed, in the shape of cable, strip or band, is conducted around cooling drum 2 while simultaneously being sprayed with water from water nozzles 2a, thus gradually being converted from a doughy or pasty state into a solid. The length of plastic is then led between a guide roller 3 and superimposed idler roll 3c and through the equalization zone 4 to feed rollers 5, and thence to its final disposition, shown here as a cutting or chopping knife. However, this can be replaced by a windup if continuous lengths of the finished cable or strip are described.

Guide roll 3 is rigidly connected to cooling drum 2, e.g., by chain and sprocket. The guide roll is driven by a continuously (or infinitely) variable drive 3a, and a free-wheeling clutch 3b is interposed therebetween. Clutch 3b may be an overriding clutch or a slip coupling. At the start of the operation, i.e., after the material has left the extruder and until it reaches the feed rollers 5, guide roll 3 and thus cooling drum 2 are driven by drive 3a. Feed rollers 5 have a barely higher speed of revolution than the peripheral speed of guide roll. Rollers 5 are driven by drive 5a which also is continuously variable, but no free-wheeling clutch is present.

The two rolls of feed rollers 5 are close enough relative to each other to afford a tight grip on the length of plastic, as is customarily the case. As soon as the cable or strip arrives at rollers 5 and is taken up thereby, these rollers, due to their slightly higher speed, provide the drive of the entire unit and thereby hold the material in a uniformly taut position. Because of the provision of the free-wheeling clutch 3b, guide roll 3 and cooling drum 2 rotate by means of the length of plastic and at a slightly higher speed than at the start of the operation.

Should a break of the cable or band occur, drive 3a, which constantly idles, immediately resumes driving of guide roll 3 and thus of cooling drum 2 until the length of plastic again is gripped by rollers 5. Thus, the interruption of the operation is at a minimum.

As a suggested, but not limiting, speed difference between feed rollers 5 and guide roll 3, a ratio of 1.05 to 1.1:1 should be named.

I claim as my invention:
1. A guide and feed device for transporting a length of extruded plastic from an extruder to a machine for further disposition, the device comprises a cooling drum for cooling said length of plastic; guide roll rigidly connected to said drum; a first, infinitely variable drive for driving said guide roll; a normally disengaged, freewheeling clutch interposed between said guide roll and said first drive, said clutch being engaged only when initially transporting said length of plastic over said drum and said guide roll and upon the occurrence of a break in said length of plastic; a set of feed rollers disposed at a suitable distance from said guide roll, said distance serving as an equalization zone for said length of plastic; a second, infinitely variable drive for driving said set of feed rollers at a speed barely higher than the speed of said guide roll whereby said feed rollers due to their higher speed normally provide the drive means for the entire device; and power means for both said drives.

2. The device as defined in claim 1, wherein the difference in speed between said guide roll and said set of feed rollers is 1.05–1.1:1.

References Cited

UNITED STATES PATENTS

| | | | |
|---|---|---|---|
| 2,697,851 | 12/1954 | Haskell | 18—1 XR |
| 2,745,134 | 5/1956 | Collins | 18—1 |
| 2,746,084 | 5/1956 | Kreidl | 18—1 |
| 3,340,565 | 9/1967 | Holly | 18—1 |
| 3,347,960 | 11/1967 | Fenlay | 18—1 |

WILLIAM J. STEPHENSON, Primary Examiner

U.S. Cl. X.R.

18—12, 15